May 18, 1937.  C. S. OLIVER  2,081,063

THRUST BEARING

Filed Sept. 26, 1935

INVENTOR
Christopher S. Oliver
BY
Mawhinney & Mawhinney
ATTORNEYS.

Patented May 18, 1937

2,081,063

UNITED STATES PATENT OFFICE 2,081,063

THRUST BEARING

Christopher Sibley Oliver, Coventry, England, assignor to Armstrong Siddeley Motors Limited, Park Side, Coventry, England Application September 26, 1935, Serial No. 42,339
In Great Britain March 1, 1935

3 Claims. (Cl. 308—168)

This invention relates to thrust bearings for machine-tool spindles or other shafts or other rotatable members, the main object being to provide an improved thrust bearing in which end play will be entirely eliminated in different working conditions.

A method of taking thrust, according to the invention—where a thrust block acts against spaced transverse faces, preferably radial faces, fast on the rotatable member—includes means for heating the thrust block internally as the temperature of the member rises, so that the resulting separation of the said transverse faces will be balanced to a greater or less extent by the expansion of the thrust block.

In a preferred arrangement according to the invention, the rotatable member has spaced collars fast thereon with a thrust block fitted between the collars, and lubricant fed between the thrust block and collars is taken to a chamber in the interior of the thrust block, the heated lubricant there serving for raising the temperature of the thrust block as necessary.

In the accompanying drawing:—

Figure 1:
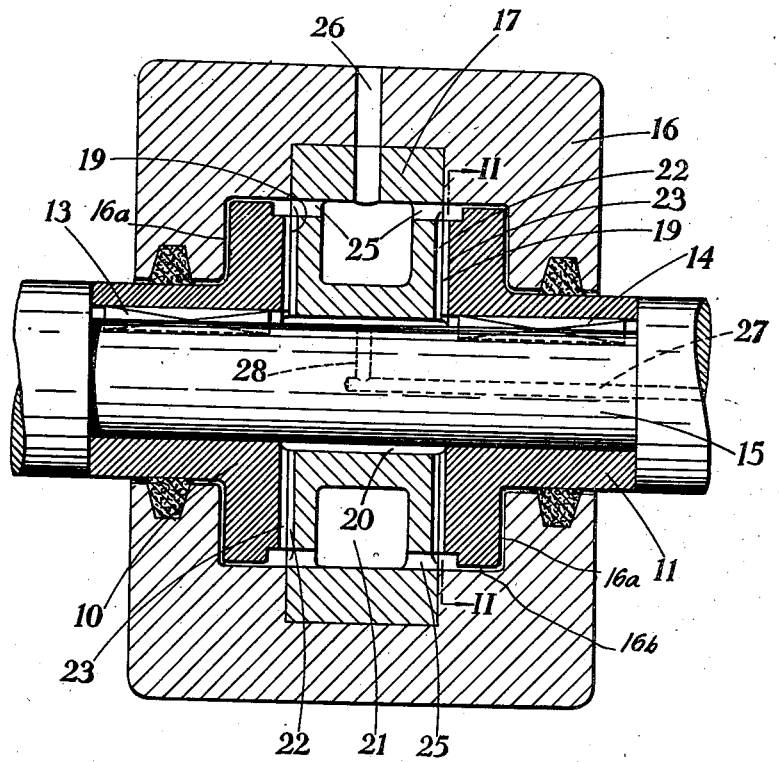
Figure 2:
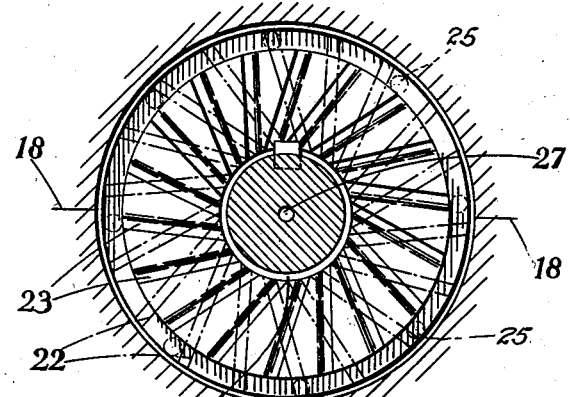

Figure 1 is a longitudinal section through one form of thrust bearing, for a rotatable member, adapted according to the invention; and Figure 2 is a cross-section taken on the line II—II of Figure 1.

In the construction illustrated, a pair of spaced collars 10, 11 are secured fast, as by keys 13, 14, upon a rotatable shaft 15 in the interior of a housing 16 for the thrust block 17. The collars have ample running clearance in the housing. The thrust block, however, is firmly held in the housing, which is split at 18 for assembly purposes, and extends between and engages the adjacent faces 19, 19 of the collars which are machined to be radial. The thrust block is spaced from the shaft with clearance at 20 and it is formed internally with an annular chamber 21. The co-acting faces of the thrust block and collars are formed with more-or-less tangential grooves which are at all events not quite radial. The grooves on one face of the thrust block, which are designated 22, are preferably inclined in the opposite direction to those, marked 23, on the adjacent face of the collar. These latter grooves are preferably formed with trailing edges in a known manner to facilitate the flow of lubricant between the contacting faces. The radially inner ends of these grooves communicate with the clearance space 20 between the thrust block and the shaft and their outer ends communicate with ports 25 in the thrust block leading to the annular chamber 21 in the interior of the thrust block. An outlet 26 is taken from the upper side of this chamber.

The parts are fitted so that there is no end play when they are cold. When the shaft is started up and its temperature rises there is a tendency for the adjacent radial faces of the collars to separate slightly from one another under the expansion of the shaft, but by means of the invention corresponding expansion of the thrust block takes place.

In the present instance lubricant is fed to the clearance space 20 between the shaft and the thrust block, as by means of the duct 27 and radial passage 28. From there it passes between the thrust faces, its temperature being raised accordingly. In then passes into the annular chamber 21 in the interior of the thrust block which is thus filled with lubricant at a temperature approximately equal to that of the thrust faces. This balance of temperature maintains the quality of fit between the collars and the thrust block.

Obviously the temperature of the lubricant can be raised to any desired extent by separate heating means.

What I claim as my invention and desire to secure by Letters Patent of the United States is:—

1. A thrust bearing, for a rotatable member, including spaced collars fast on the rotatable member, a stationary thrust block fitted between said collars, said thrust block being spaced from said rotatable member and having in its interior an annular chamber, said rotatable member having means for feeding lubricant to the space between said thrust block and rotatable member, said thrust block and collars having grooves in the coacting faces thereof, said grooves communicating at their inner ends with the space between said thrust block and said rotatable member and at their outer ends with the annular chamber within said thrust block, said thrust block having an outlet leading from the interior of said annular chamber.

2. In a thrust bearing construction, a housing, a shaft extending through the housing, thrust collars fixed to and rotating with said shaft and movable with said shaft away from one another when the shaft is heated due to rotation, a thrust block fixed to said housing between the thrust collars and spaced from the shaft to provide a clearance space, said shaft having passages therein for introducing a fluid to said clearance space, said thrust block having with the thrust collars grooves between said blocks and collars, said grooves connecting at their inner ends with said clearance space, said thrust block having an internal chamber, said thrust block also having ports communicating with the internal chamber and with the outer end portions of said grooves for admitting into the chamber the fluid which has been circulated outwardly through said grooves and heated by contact with said collars and the outer walls of said thrust block, whereby to raise the temperature of the thrust block by internal and external application of said fluid proportional to the rise in temperature of said thrust collars to cause the thrust block to expand and follow the collars in their movement apart.

3. In a thrust bearing construction, a housing, a shaft passing through said housing, thrust collars fixed on said shaft in spaced relation to each other and having grooved thrust faces, said collars adapted to move apart on expansion of the shaft due to heat of rotation, a thrust block carried within the housing between said collars and having grooved thrust faces normally in contact with the grooved thrust faces of said collars, said thrust block having a large internal chamber with thin walls opposite said grooved thrust faces of the block, said thin walls having ports in their outer portions communicating interiorly with said chamber and exteriorly with the outer portions of the grooved thrust faces of said collars and block whereby to introduce fluid circulated through said grooved thrust faces of the block and collars and which has become heated by contact therewith into the internal chamber of the block to heat the walls of such chamber and thereby to cause the block to expand in step with the expansion of the collars, and means to supply fluid to the inner portions of said grooved thrust faces.

CHRISTOPHER SIBLEY OLIVER.